UNITED STATES PATENT OFFICE.

JOHN McLEAN, OF JACKSON, MICHIGAN, ASSIGNOR OF ONE-HALF HIS RIGHT TO HENRY HAGUE, OF SAME PLACE.

IMPROVEMENT IN ARTIFICIAL STONE.

Specification forming part of Letters Patent No. 147,418, dated February 10, 1874; application filed July 9, 1873.

*To all whom it may concern:*

Be it known that I, Dr. JOHN McLEAN, of the city of Jackson, in the county of Jackson and State of Michigan, have invented a certain Compound called "Artificial Stone," to be used for all building and other purposes for which stone is usually made use of, of which the following is a specification:

This invention relates to a composition formed by mixing ordinary building-sand and potash with Dr. McLean's cement, which consists of silica, alumina, anhydrous sulphate of lime, oxide and sulphurets of iron and magnesia.

To prepare this composition, take about six hundred and sixty-six pounds of dry sand and about one hundred and thirty-three pounds of Dr. McLean's cement, dry. Thoroughly mix them; then moisten the mixture with water in which is dissolved one pound of potash; then add sufficient water to bring the mixture to a proper consistency for molding. (The quantities of each article varies in proportion, according to quality.)

The molding may be done by placing the composition thus made in molds, and then thoroughly pressing or tamping it, or it may be done by moistening the mixture sufficiently and running into the molds.

The object of this invention is to furnish a cheap artificial stone, which combines strength, durability, and fire-proof qualities.

I claim as my invention—

The compound of sand, potash, and Dr. McLean's cement, which consists of silica, alumina, anhydrous sulphate of lime, oxide and sulphurets of iron and magnesia, substantially as and for the purposes hereinbefore set forth.

JOHN McLEAN.

Witnesses:
AURELIUS O. KENENAUGH,
CHESTER M. BRIDGMAN.